United States Patent [19]

Johnson

[11] 4,029,415
[45] June 14, 1977

[54] LASER LAND-SURVEYING APPARATUS WITH DIGITAL DISPLAY

[75] Inventor: Phillip R. Johnson, Mandan, N. Dak.

[73] Assignee: Dakota Electron, Inc., Mandan, N. Dak.

[22] Filed: Feb. 3, 1975

[21] Appl. No.: 546,543

[52] U.S. Cl. .................................... 356/4; 356/1; 356/141; 356/172; 33/294
[51] Int. Cl.² ................... G01C 3/08; G01C 3/00
[58] Field of Search ............ 33/286, 293, 294, 1 H; 356/1, 4, 5, 141, 152, 172

[56] References Cited

UNITED STATES PATENTS

| | | | |
|---|---|---|---|
| 3,620,626 | 11/1971 | Daly et al. | 356/4 |
| 3,687,556 | 8/1972 | Price et al. | 356/1 |
| 3,894,230 | 7/1975 | Rorden et al. | 356/172 |

Primary Examiner—Maynard R. Wilbur
Assistant Examiner—S. C. Buczinski
Attorney, Agent, or Firm—Williamson, Bains, Moore & Hansen

[57] ABSTRACT

A land-surveying apparatus for use with a laser beam source to obtain grade and range distances has a grade pole with a laser beam detection unit slidably mounted thereon, electrical measuring means being connected between the grade pole and the detection unit to generate an electrical grade signal representative of the grade distance between a detector using an array of phototransistors and the base of the grade pole. A digital display unit receives the grade signal, processes it, and digitally, visibly displays the information contained in the signal. Electrical grade calculating circuitry is provided to process first and second grade signals containing the elevation of the upper and lower edges of the laser beam relative to the base of the pole and arithmetically process the signals to obtain the elevation of the laser beam center which is then displayed as the grade distance. Electrical range calculating circuitry is provided to selectively use information contained in the laser beam and generate a range output signal representing the range distance between the laser beam detector and the laser source, the range calculating circuitry delivering the range output signal to the digital display unit where the range distance is visibly, digitally displayed to the operator. The digital display unit is preferably housed in a control console which is pivotally mounted to the laser beam detection unit and also detachable from the detection unit to permit an operator to hold the control console, permitting easier reading of the digital display and more convenient operation of the console when the laser beam detection unit is at an inconvenient height on the grade pole.

20 Claims, 8 Drawing Figures

LASER LAND-SURVEYING APPARATUS WITH DIGITAL DISPLAY

BACKGROUND OF THE INVENTION

The advantages of a rotating or swinging laser source to define a reference light plane receivable by a detector positioned on a grade pole have been long appreciated by land surveyors. Because a rotating laser beam can define a sharply delineated narrow plane of light at even substantial distances from the laser source, considerable effort has been expended by surveying authorities in developing detection apparatuses to locate such laser planes. Typically, the detection apparatuses utilize an upright grade pole carrying a photocell which is slidably mounted on the grade pole, permitting an operator to slide the photocell upwardly and downwardly until it intercepts the laser plane and perceptibly indicates the interception to the operator. The operator then determines the distance between the center of the laser plane and the base of the grade pole. This distance is hereafter referred to as the grade distance or grade of the particular point at which the grade pole is situated.

The laser beam detectors now available for use in surveying have a pointer or hairline which moves with the photocell along the grade pole's linear scale, and using the pointer, the operator must read and interpolate the scale to obtain the precise vertical positions of the upper and lower edges of the laser plane. The accurate reading and interpolating of fine scale divisions requires skill and experience, and even then the scale can easily be misread, introducing error into the calculation. Accurate reading of the scale becomes increasingly difficult when the grade pole is located in a shadowy or semi-dark location such as the often poorly lighted interior of a building under construction. In the event the detector must be moved to a location on the pole which is above the operator's eye level in order to intercept the laser beam, it is still more difficult for the operator to accurately read and interpolate the scale divisions. The same difficulty arises when the detector is moved to a location on the grade pole where the operator must kneel or bend over to read the scale divisions. These difficulties have been eliminated by the present invention.

Another shortcoming of the now available laser detection apparatuses for land surveying is that while they measure grade distance, none are able to measure the distance between the laser source and the grade pole, hereafter called the range distance or range. It is desirable that the surveyor be able to easily determine the range distance, and the present invention digitally displays this distance on command without any calculations being required of the operator.

Still another shortcoming of most available detection apparatuses is that they are ineffective in bright daylight due to sunlight masking the laser beam from the detector, which is typically a photocell. It would be desirable to provide a detector usable under any likely-to-be encountered lighting conditions. The present invention provides such a detector.

SUMMARY OF THE INVENTION

The invention relates to the field of laser land surveying and comprises a new surveying apparatus for receiving a laser beam and from the beam determining range and grade distances.

The invention has a laser beam detection unit slidably mounted on a grade pole for upward and downward movement along the pole and includes a laser beam, the detector provided with a plurality of frequency selective phototransistors, each of which is sensitive to the particular laser beam frequency of the laser source. These phototransistors are positioned behind an optical filter which is frequency selective to permit passage of light at the laser beam frequency and to substantially attenuate other frequencies. This combination of frequency-selective filter and phototransistors permits high sensitivity to the laser beam but attenuates the light frequencies common to ambient light, permitting the detector to be substantially unresponsive to ambient daylight or to artificial lighting conditions.

The invention utilizes measuring means coupled between the grade pole and the beam detection unit to determine the elevation of the detector above the base of the pole, the measuring means producing an electrical grade signal representative of that elevation. The grade signal is fed to a digital display unit which converts the signal to a visible, digital display easily read by an operator. A calculator is provided to receive first and second grade signals representing the elevation of the upper and lower edges of the laser beam, respectively, and to then obtain the average of these distances which would define the elevation of the center or axis of the laser beam, the calculator delivering this average to a display component for visible, digital display as the grade distance or grade between the base of the grade pole and the laser plane. The brilliant light-emitting diodes of the display component are easily read even in shadowy building interiors and eliminate the difficulty of manually reading and interpolating the grade pole scale, thereby reducing operator error and producing higher accuracy. The digital display unit may be mounted in a control console and the console pivotally mounted to the beam detection unit, permitting the console to be manually swung about a horizontal axis so as to be easily read from above or below the unit by an operator. The console is also detachable from the detection unit, permitting it to be conveniently operated and read by the operator even when the detection unit is at an inconvenient elevation.

A first embodiment of the invention includes range calculating circuitry for determining the range distance separating the laser beam source and the laser beam detection unit, the range circuitry determining the absolute difference between the first and second grade signals representing the elevations of the upper and lower edges of the laser beam, respectively, to obtain the laser beam width. Because the laser beam width increases linearly with the distance from the laser source, the range calculating circuitry next multiplies the beam width by a constant to obtain a product representing the range distance separating laser source and detector. This range value is visibly, digitally displayed by the display component. This first embodiment of the invention which determines range using the width of the laser beam functions with high accuracy and effectiveness whether the laser beam is stationary or swinging about an axis to define a laser plane.

A second embodiment of the invention usable with a rotating laser source differs from the first embodiment in that the range distance is determined from the time interval required for the laser beam to pass the beam detector. The second embodiment is designed to determine range with extreme accuracy when the laser beam source is being rotated about an axis at a known angular velocity. The laser beam detector generates a signal of given time duration each time the rotating laser beam is incident on the detector. This signal is fed to a comparator where it is compared with a reference signal of known time duration generated by a clock oscillator. The comparator produces a range output signal representative of the distance between detector and laser source and delivers it to the digital display unit, where it is visibly, digitally displayed at the command of the operator.

The invention thus results in a substantially improved detection unit which displays both grade and range distances, is usable under any likely-to-be-encountered light conditions, is easily and unmistakably read by even an inexperienced operator without dependence on manual reading or interpolation of a grade pole scale, is easily manufactured, extremely accurate, reliable and long lasting. These and other advantages will appear from the appended drawings and the following detailed description.

DESCRIPTION OF THE PREFERRED EMBODIMENTS

Figures 1, 2, 3, 4, 5, 6:
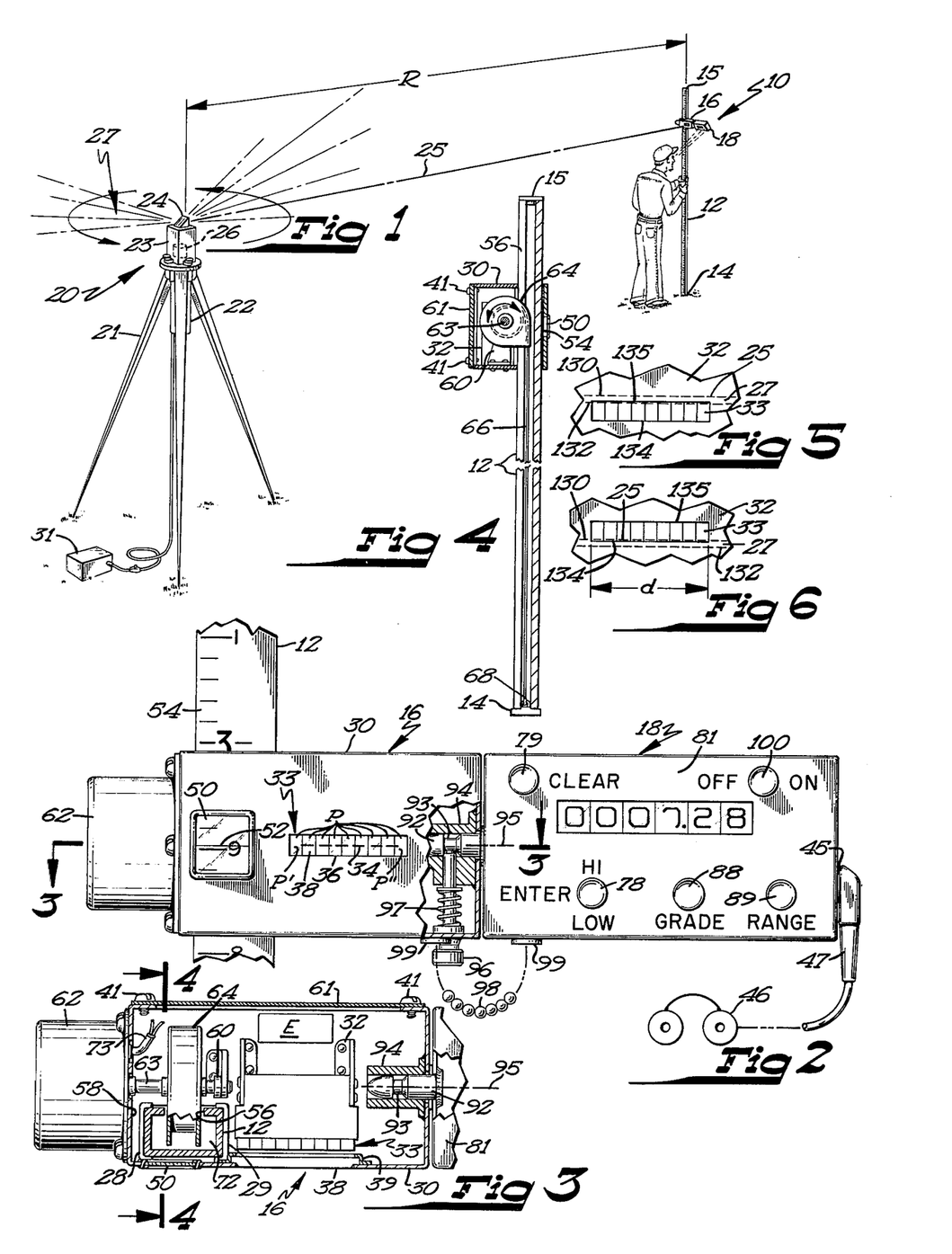
FIG. 1 shows a laser source projecting a plane of laser light which is being received by a land-surveying apparatus embodying the invention.
FIG. 2 is a front elevation view, partially in section, of a laser land-surveying apparatus embodying the invention.
FIG. 3 is a partial, sectional top elevation view of the beam detection unit of FIG. 2 taken along cutting plane 3—3.
FIG. 4 is a sectional side elevation view of the beam detection unit of FIG. 3 taken along cutting plane 4—4.
FIG. 5 is a partial front elevation view of the beam detection unit of FIG. 2 showing a laser plane having its lower edge impinging on the beam detector.
FIG. 6 is a partial front elevation view of the beam detector of FIG. 2 showing a laser plane having its upper edge impinging on the beam detector.

Referring now to FIG. 1, a laser land-surveying apparatus 10 embodying the invention has an elongated, rigid grade pole 12 with base 14 and apex 15. A laser beam detection unit 16 is mounted to the grade pole 12 between base 14 and apex 15 for relative motion between the pole and the detection unit 16, it being preferred that the unit 16 be slidable along the grade pole in both upward and downward directions by the operator. A control console 18, described in detail hereafter, is carried by the detection unit 16 and is provided with controls to operate the surveying apparatus 10 and a display component to digitally, visibly display distance measurements.

Spaced remotely from the grade pole 12 is a laser beam source 20, which includes a mount such as tripod 21, a power source 31, an appropriate laser generating tube 22 supported by a tube housing 23, it being preferred that the tube 22 have its longitudinal axis vertically oriented to project the laser beam vertically. Suitable mounts for laser tubes are readily available, and any of a number of commercially available mounts may be used to hold and orient the laser tube, a plurality of leveling screws generally being provided to accomplish the necessary vertical orientation. At the top of the tube housing 23, a rotatably mounted mirror 24 intercepts the laser beam from tube 22 and deflects it through a right angle, resulting in the laser beam 25 being projected radially outward in a horizontal plane. A motor 26 is coupled to the rotatably mounted mirror 24 to spin the mirror about a generally vertical axis at up to 1,200 rpm, resulting in the rotating laser beam 25 defining a laser light plane 27. The low light divergence which is a characteristic of laser plasma tubes permits the establishment of the horizontal laser plane 27 which provides a reference plane from which measurements will be obtained using the apparatus 10. By using a collimator it is possible to obtain even more gradual divergence of the laser beam and to thereby use the laser plane 27 for surveying at a still greater distance from the source 20. While the apparatus 10 is shown herein as used with a horizontal laser beam and laser plane, it should be understood that the laser plane could be vertical or at angles between the horizontal and vertical without reducing the effectiveness of the apparatus 10.

While any of a variety of laser plasma tubes ma be used with the laser source 20, it is preferred to use a helium neon laser tube generating an output light wavelength of approximately 6,328 angstroms. While the rotating mirror 24 may be replaced by an appropriate prism or pentaprism, it has been found that the mirror 24 is often more effective because the efficiency of the mirror 24 is higher than that of a prism or pentaprism. The land-surveying apparatus 10 is effective whether the laser beam 25 is stationary or, alternatively, is rotating to generate the laser plane 27.

Referring now to FIGS. 2 and 3, the laser beam detection unit 16 is provided with interior guides 28 and 29 extending inwardly from the case 30 and closely, slidably contacting the grade pole 12 to permit the detection unit 16 to be slidably moved along the grade pole when moved by an operator but to otherwise remain in position on the grade pole without slippage. While a particular set of guides has been shown as permitting sliding movement between grade pole 12 and case 30, it should be understood that any alternative structure known to the art and capable of producing an appropriate sliding engagement between the grade pole 12 and the case 30 may be substituted and is within the purview of the invention.

Figure 7:
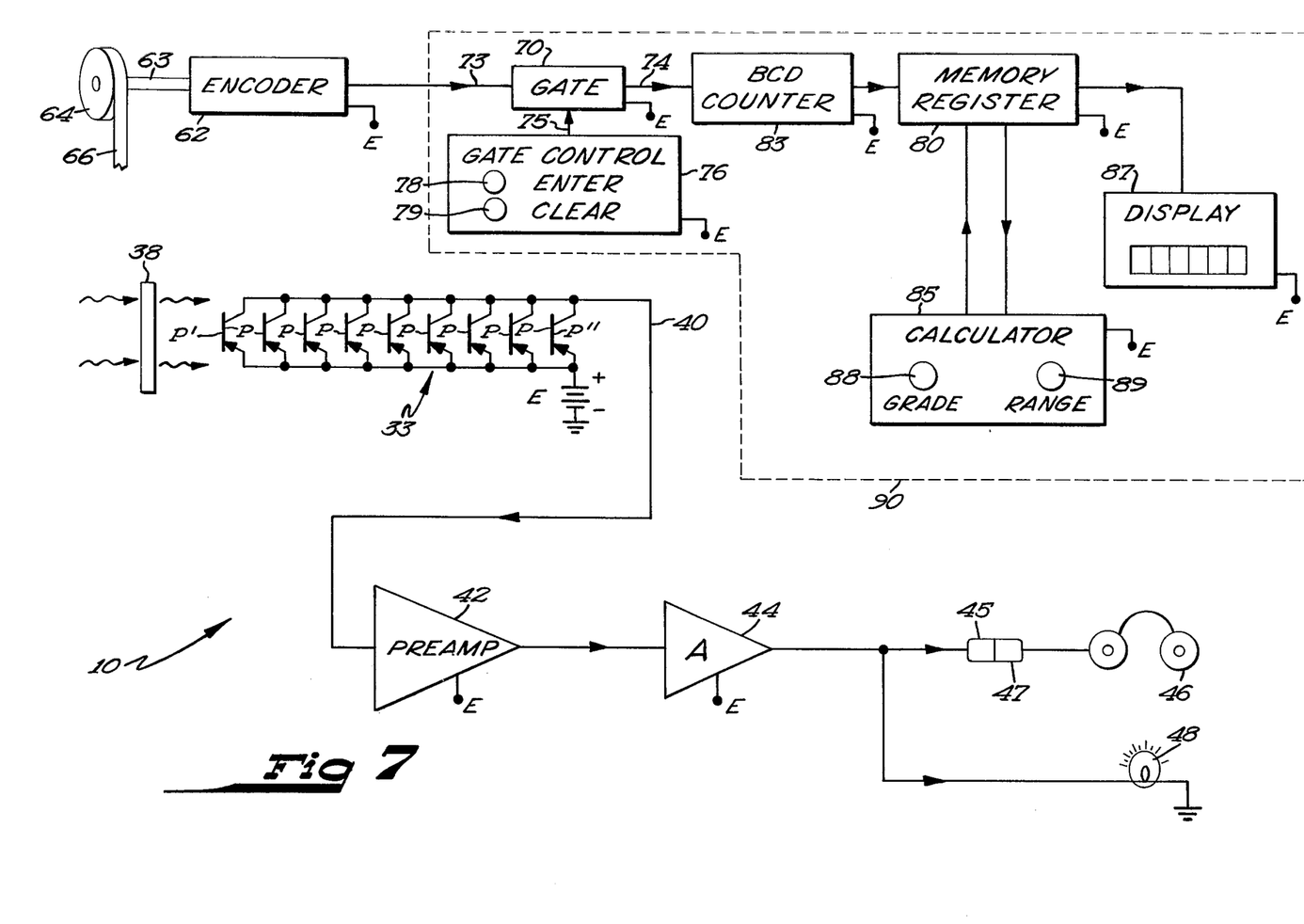
FIG. 7 is a schematic diagram showing the components comprising a first embodiment of the land-surveying apparatus.

Within the case 30 is a detector support frame 32 which is fixed to the case 30 and extends inwardly to permit the mounting thereon of an array 33 of phototransistors P which comprises a laser beam detector. The phototransistors at the extreme ends of the array 33 are designated as P' and P'' (FIG. 7). The preferred phototransistor array 33 is a commercially available component and has nine adjacent phototransistors P, each transistor occupying approximately one-tenth inch and arranged along a common, generally horizontal array axis 34. While the preferred phototransistor array has nine closely spaced phototransistors, it should be understood that a greater or lesser number of transistors could be used in place of the shown array 33 and is within the purview of the invention.

It is highly desirable that the phototransistor array 33 be responsive to the light frequency generated by the laser tube 22. In addition, it is highly desirable that the phototransistors of the array 33 be frequency selective and that they be substantially unresponsive to light frequencies outside the range of the laser tube 22. By selecting the phototransistor array in this manner, the array will be substantially unresponsive to ambient light incident on the array, and accordingly can readily be used as a laser beam detector under any likely-to-be-encountered light conditions.

Best results have been obtained when the phototransistors of the array 33 are connected in parallel with the battery power source E (FIG. 7) so that as the laser beam 25 successively strikes each phototransistor P, the phototransistors become briefly conducting and each generates a short duration electrical pulse. The closely spaced phototransistors P connected in parallel cause a prolonged output signal to be generated by the phototransistor array 33. Accordingly, the output from the nine-transistor array 33 is approximately nine times as long as that which would occur if a single phototransistor were used in the place of the array. This prolonged output signal from the phototransistors greatly increases the ease with which a visible and audible indication of laser beam reception can be produced, as will be described further hereafter.

Because the laser beam, if rotating at speeds of up to 1,200 rpm, will impinge on each phototransistor P for the briefest of time intervals, it is of great importance that each phototransistor have an extremely short rise and fall time in order to be responsive to the fast moving laser beam. Preferably, the phototransistors used in the array 33 should have a rise and fall time on the order of three to four microseconds and for best results the array axis 34 should be parallel to the laser plane 27.

At the front of the case 30 in an orifice 36 across which a frequency selective optical filter 38 is mounted by clips 39 or any other appropriate means known to the art, the filter 38 confronting array 33 to filter light otherwise incident on the array. The filter 38 is selected from commercially available filters and should have a characteristic that provides little opposition or attenuation to the passage of the light at laser beam frequency while being highly attenuating to light frequencies outside the frequency range of the laser beam. By using such a filter the light frequencies commonly encountered in ambient light can be greatly attenuated by the filter 38, thereby substantially reducing the intensity of ambient light which reaches the transistor array 33. The combination of a frequency selective filter 38 and frequency selective phototransistor array 33 assures that the array 33 is not easily confused by ambient light conditions and is responsive only to the laser beam 25. Accordingly, the invention can effectively be used even in normal daylight and sunlight conditions and is not limited to use within a shaded building interior. The array 33, filter 38, and case 30 collectively comprise the laser beam detection unit 16.

The output 40 of the transistor array is electrically connected to the input of a preamplifier 42, which is preferably positioned within the case 30 and energized from the battery power source E. The output of the array 33 is amplified in the preamplifier 42 and delivered to an amplifier 44 positioned in case 30 or console 18 and energized by the battery E. The output of the amplifier 44 is connected in series to a sound generating device such as an earphone or speaker 46, the earphone 46 being detachably mounted to the console 18 by female plug 45 and male plug 47, the plug 45 preferably being positioned on the console 18 and being electrically connected to the output of the amplifier 44. If desired, a visual indicating device such as light-emitting diode 48 may be connected in parallel with the earphone or speaker 46 to provide a visual indication that the phototransistor array 33 is intercepting the laser beam 25. The preamplifier 42, amplifier 44, and earphone 46 or light-emitting diode 48 collectively constitute one type of indicating means usable with the invention to produce an indication of laser beam detection perceptible to the operator.

A window 50 (FIGS. 2 and 3) having a pointer or hairline 52 is aligned to overlay the scale 54 of the grade pole 12, the hairline 52 aligned with array axis 34 to permit the operator to visually confirm the position of the array axis 34 on scale 54 to readily determine that the apparatus 10 is properly calibrated and reading true.

Referring now to FIGS. 3 and 4, the grade pole 12 is of generally rectangular cross section with a longitudinal slot 56 extending from the base 14 to apex 15, although it should be understood that other cross sectional configurations could be substituted and are within the purview of the invention. Endwall 58 of case 30 supports incremental encoder 62. The incremental encoder 62, to be described further hereafter, is mounted to the endwall 58 with its elongated shaft 63 extending through an aperture in the endwall 58 and is rotatably mounted relative to the endwall 58, permitting the shaft 63 to be freely rotated within predetermined angular extremes. The end of the shaft 63 is rotatably mounted in bearing support 60, which is attached to the case 30 in any known manner. The cover is detachably secured to case 30 by screws 41.

A tape reel 64 is fixed to the shaft 63 to rotate therewith, and a spring-loaded, extendable tape 66 is coiled on the reel 64, the tape having a remote free end 68 fixed to the base 14 of the grade pole 12 in any known manner. As the detection unit 16 is slid upwardly or downwardly along the grade pole 12, the tape 66 on reel 64 unwinds and winds, respectively, keeping the tape 66 taut between the reel 64 and the base 14. As the tape 64 winds and unwinds in response to movement of the detector 16, the shaft 63 of encoder 62 rotates, changing the angular position of the shaft 63.

The encoder 62 is a commercially available incremental shaft encoder characterized in that it generates a grade signal containing a series of electrical pulses repesentative of the angular displacement of shaft 63. This incremental encoder is connectable to the battery power source E to energize the encoder. The encoder 62, tape 66, and tape reel 64 collectively comprise a measuring means mechanically coupled between the detection unit 16 and the grade pole 12, the measuring means determining the distance between the laser beam detector's array axis 34 and the base 14 of the pole 12, the encoder generating an electrical grade signal containing information representative of the distance between the base 14 and the detector axis 34. The electrical grade signal produced by the encoder 62 is electrically conducted to the input 73 of a gate circuit 70 which may be positioned in the control console 18 and will be described further hereafter.

By positioning the encoder shaft 63 closely adjacent the grade pole 12, the tape reel 64 is positioned partially within the internal cavity 72 of the grade pole, and the tape extending between the reel 64 and the base 14 of the pole is wholly contained within the pole 12 and is not subject to damage or abuse.

It is preferred that the described measuring means which comprises the encoder, tape and tape reel be positioned in the case 30 along with the array 33, peamplifier 42, and amplifier 44.

Referring now to FIG. 7, the gate 70 comprises an electronic circuit energized from the battery power source E and having an input terminal 73 and output terminal 74, the gate 70 also being provided with a control terminal 75. The circuitry of the gate 70 is well known to the art and its operation is such that a signal arriving at input terminal 73 is not permitted to pass through the gate to output terminal 74 until a command signal or trigger pulse is delivered to the control terminal 75, the command signal triggering the passage of the grade signal from input terminal 73 to output terminal 74.

A gate control circuit 76 is energized by the battery source E and comprises a gate control means to provide triggering signals to the gate circuit 70 when either an enter button 78 or clear button 79 is depressed by the operator. When the enter control 78 is actuated, the gate control circuit 76 delivers a trigger signal to control terminal 75 of the gate circuit 70 to permit a grade signal from the encoder 62 to pass through the gate to the memory register 80. Actuation of the clear control 79 by the operator generates a triggering pulse which is passed through the gate circuit 70 to the memory register 80 is to signal the register 80 that all previously received data is to be cleared from the register. The circuitry to accomplish these objects is well known to the art and need not be described further herein. The enter and clear controls 78 and 79, respectively, are preferably push-button, momentary on switches and are positioned on the face 81 of the control console 18 as best shown in FIG. 2.

Referring again to FIG. 7, binary coded decimal counter 83 is connected to the output 74 of gate circuit 70 to receive the grade signals generated by the incremental encoder 62, the counter 83 serving as a conversion means by counting the pulses in the grade signal from the encoder and in response thereto generating a binary coded decimal output signal representative of the information contained in the encoder's grade signal. The binary coded decimal output leaving the counter 83 is electrically conducted to the memory register 80. The counter 83 is energized from the battery power source E.

The memory register 80 is selected from commercially available circuitry known to the art and is energized by the battery power source E. The binary signals from the counter 83 are received by the memory register 80 and are retained in the memory register until the power source E is turned off or the clear control 79 of gate control 76 is actuated, causing the register 80 to be cleared.

Data retained or stored in the register 80 is fed to the calculator 85 where the data may be selectively arithmetically processed and returned to the register 80 for display by the display component 87, the calculator and display component both being energized by the battery power source E.

The calculator 85 contains circuitry well known to the art and accordingly will only be described briefly. The calculator is provided with a grade control 88 and grade calculating circuitry. When the control 88 is actuated by an operator, the grade calculating circuitry adds a pair of binary signals stored in the memory register and divides their sum by two to obtain the average value of the signals stored in the register 80. The object of this calculation is to obtain the elevation of the center of the laser beam 25 relative to the base 14 of grade pole 12. The result is achieved by first determining the elevation of the upper edge of the laser beam 25 relative to the base 14 by use of the array 33, as will be described in detail hereafter, and entering this elevation figure in the memory register 80. Next the operator obtains the elevation of the lower edge of the laser beam 25 relative to the base 14 and enters that elevation in the memory register. By then actuating the grade control 88, the grade calculating circuitry totals the two elevation figures representing the extreme edges of the laser beam and averages their values to thereby accurately determine the location of the center or axis of the laser beam which represents the grade distance separating the laser beam from the base 14 of the pole 12.

It has been found that the beam width of laser beam 25 or plane 27 increases gradually as the distance from the laser source 20 increases. The width of the beam 25 or laser plane 27 varies in direct proportion to the distance from the laser beam source. Accordingly, by determining the width of the laser beam at the point at which the grade pole 12 is situated, and by then multiplying the beam width by a predetermined, known constant, it is possible to obtain a reasonably accurate measurement of the range or range distance separating the laser source 20 and the detector array 33.

The calculator 85 also includes range calculating circuitry which obtains the absolute difference between the elevations of the upper and lower edges of the laser beam to thereby determine the beam width. The range calculating circuitry then multiplies this absolute difference by a predetermined constant and delivers the product to the memory register 80 for display component 87 as the range distance which separates the detector array 33 and the laser source 20. The range calculating circuitry is activated by an operator actuating the range switch 89 of calculator 85, both the grade switch 88 and range switch 89 preferably being pushbutton, momentary on type switches.

The display component 87 may be selected from a variety of commercially available industrial digital counters preferably having a minimum of six-digit display capacity. The component 87 includes circuitry for decoding the signal received from the memory register, and also appropriate circuitry for driving the digital display. Typically a series of decade counters will be used to control the individual digits of the display component 87. It is preferred that the easily readable, light-emitting diode type display be used for the numerals, permitting them to be easily read even in a shadowy or darkened building interior, minimizing the likelihood of error by an operator. The described easily ready display, or an equivalent lighted digital display, eliminates the need for the operator to read and interpolate the scale 54 on the grade pole 12, thus greatly simplifying the determining of the grade distance.

The gate circuit 70, gate control 76, counter 83, memory register 80, calculator 85, and display component 87, connected in the relationship shown in the schematic diagram of FIG. 7, collectively comprise a digital display unit 80 usable with the invention. While it is not essential that all of the recited components of the display unit 90 be contained in the control console 18, it has been found highly desirable to contain them in the console 18 so that all operating controls and the display are in a single location for convenience of the operator.

The control console 18 (FIGS. 2 and 3) is provided with an outwardly extending cylindrical coupling 92 having an annular groove 93 thereabout. The beam detection unit 16 has a socket 94 for matably receiving the cylindrical coupling 92 and permitting pivotal movement of the coupling 92 in the socket 94 to permit the control console 18 to be pivoted about a generally horizontal axis 95 permitting an operator to swing or tip the console to positions where it is easily read from below or above (FIG. 1) the operator's eye level.

A movable pin 96 passes through the front of the case 30 and is spring biased by the spring 97 to urge the pin into the annular groove 93 of coupling 92 to retain the coupling 92 in the socket 94. By pulling the pin 96 outwardly from the case 30, the operator may easily extract the cylindrical coupling 92 from the socket 94 to free the control console 18 from the case 30. The operator may thus hold the console 18 in his hands when the detection unit 16 is at an inconvenient height on the pole 12 to more easily and conveniently view the digital display component 87 and perform all control operations. A cable 98 (FIG. 2) extends between the case 30 and the control console 18 and is attachable to the case 30 and the console 18 by means of mounted plugs 99. Preferably the cable 98 is spring coiled to be easily extensible and contains all electrical lines extending between the case 30 and console 18.

An off/on control such as button 100 (FIG. 2) may be provided to selectively connect the array 33, encoder 62, preamplifier 42, amplifier 44, gate 70, counter 83, register 80, display 87, calculator 85 and gate control 76 to the battery power source E.

In operation, when the operator wishes to obtain the grade and range distances associated with a given location, the operator first actuates the laser beam source 20 to produce a laser beam 25 which may be either stationary or, alternatively, rotating to define a plane of light 27. While the apparatus 10 is usable with laser planes which are not horizontal, it will be presumed that the plane 27 is horizontal is describing the operation of the invention. Once the laser source 20 is in operation and is projecting a laser beam 25 to the location at which grade and/or range distances are to be obtained, the source 20 can be left unattended while the operator moves to the location with the land-surveying apparatus 10 to perform the necessary steps. The operator first positions the base 14 of the grade pole 12 at the location at which a grade reading is required and orients the pole 12 vertically. For purposes of the disclosure, the distance or grade refers to the distance between the base 14 and the laser plane 27, and the term range distance or range refers to the horizontal distance between the laser source 20 and the phototransistor array 33.

The operator presses the off/on button 100 to connect the battery power source E to all of the electrical components of the land-surveying apparatus 10 to energize them. He next depresses the clear button 79 to clear register 80. He manually slides the case 30 of laser beam detection unit 16 upwardly or downwardly alont the grade pole 12 to locate the laser plane 27. Since ambient light having frequencies distinct from the laser beam 25 are substantially attenuated by filter 38 before reaching the phototransistor array 33 and because the array 33 is generally unresponsive to ambient light frequencies distinct from the laser beam frequency, it is immediately evident when the array 33 intercepts the laser beam 25.

When the beam 25 strikes the phototransistor array 33, each transistor P becomes conducting when actuated by the laser beam 25, resulting in current flow from the battery power source E, through the phototransistor, and to the preamplifier 42. If the beam 25 is rotating in a plane 27, the swinging laser beam moves across the successively, side-by-side positioned phototransistors, each of the transistors becomes conducting for a brief time interval determined by its exposure time to the beam 25, and conducts long enough for a short voltage spike or pulse to pass therethrough to the preamplifier 42. Because nine phototransistors are used in the array 33, nine successively generated pulses will be delivered to the preamplifier 42 to produce a prolonged overall grade signal each time the laser beam 25 sweeps along the array 33. The preamplifier 42 amplifies the magnitude of the pulses from the array 33 and delivers them to the amplifier 44 where further amplification occurs. The output of the amplifier 44 is fed directly to female plug 45 in console 18 and delivered to the male plug 47 of the earphone 46. Each time the laser beam crosses the array 33, a sharp staccato-like sound is generated by the earphone and is readily perceptible to the operator wearing the earphone 46. If desired, a light-emitting diode 48 may provide a visual indication, the diode flashing brightly each time the laser beam crosses the array 33. In noisy locations where an operator might find it difficult to use the earphones, the light-emitting diode 48 can be helpful in detecting the laser beam 25 and would be positioned either on case 30 or console 18.

After the operator has located the approximate elevation of the laser beam, as described above, he next carefully locates the upper edge 130 and lower edge 132 of the beam 25. To locate the upper edge 130 of the beam, the operator slides the detection unit 16 upwardly (FIG. 6) until the beam is marginally striking the lower edge 134 of array 33, causing a barely discernible audio signal on the earphone 46 or marginally visible flashing of light-emitting diode 48. At this position of the array 33, upper edge 130 of laser beam 25 is marginally striking the lower edge 134 of the array, as shown in FIG. 6. The operator now actuates the enter button 78 of gate control 76. The gate control 76 in response delivers a trigger pulse to the control terminal 75 of the gate 70, resulting in a first electrical grade signal flowing from encoder 62, through gate 70 and counter 83 to memory register 80. This first electrical grade signal contains information representative of the elevation of the upper edge 130 of the laser beam 25 relative to base 14. The memory register 80 stores the information obtained from the first grade signal in the register for later arithmetical action, as will be described hereafter.

The operator locates the lower edge 132 of the laser plane 27 by sliding the detection unit 16 downwardly until the lower edge 132 of laser plane 27 just marginally strikes the upper edge 135 of the phototransistor array 33, as best shown in FIG. 5. The operator then actuates the enter control 78 again to enter in register 80 a second electrical grade signal containing information representative of the elevation of the lower edge of the laser plane 27 relative to base 14, the details of which will next be described.

As the detection unit 16 is moved upwardly or downwardly by the operator to locate the upper and lower edges of the beam, the tape 66 winds onto or off the tape reel 64, resulting in the reel 64 and shaft 63 of encoder 62 being rotated. The encoder 62 generates an electrical grade signal containing information representative of the angular displacement of the shaft 63 and is calibrated such that the grade signal is accurately representative of the distance between the base 14 and the axis 34 of array 33. This grade signal leaves the encoder and is delivered to the input terminal 73 of gate 70, but cannot pass through the gate to the output terminal 74 until the gate is triggered to a conducting state by the operator depressing the enter control 78 on gate control 76. When the enter control 78 is actuated, the gate 70 becomes conducting and the grade signal from the encoder 62, representing the instantaneous position of the array axis 34 relative to the base 14 of the grade pole, is conducted to the binary coded decimal counter 83. The counter 83 converts the grade signal from the gate 70 to binary form and relays it to the memory register 80 where it is entered and retained until the clear control 79 of gate control 76 is actuated by the operator.

As the first electrical grade signal, representative of the elevation of the upper edge 130 of the laser beam 25, is entered in the memory register 80, it is substantially simultaneously displayed by the light-emitting diodes of display component 87 so that the elevation may be easily read by an operator if desired. In fact, the first electrical grade signal, representing the upper edge elevation of the laser plane 27, is not of immediate interest to the operator except in so far as he, by inspection of the display component 87, then knows that it has been entered in the memory register 80.

After entering the first electrical grade signal in the memory register, the operator obtains the elevation of the lower edge 132 of the laser beam 25, as already described, and actuates the enter control 78 to enter the second electrical grade signal in the memory register 80, the display component 87 then substantially simultaneously displaying the second electrical grade signal representing the elevation of the lower edge 132 of the laser beam 25 relative to base 14.

At this stage, the operator has supplied the memory register 80 with all information it requires to determine the grade distance and range distance at the location of the grade pole. The operator next actuates the grade control switch 88, causing the grade calculating circuitry of calculator 85 to arithmetically process the elevation distance information obtained from the first and second electrical grade signals to obtain the elevation of the center or axis of the laser beam 25. The grade calculating circuitry adds the elevation information in the first and second electrical grade signals and divides their sum by two, the resulting quotient being fed back to the memory register 80 and immediately displayed on the display component 87 as the grade distance separating the base 14 of pole 12 from the axis or center of the laser beam 25.

After completing the grade distance calculation, the memory register 80 continues to retain the elevations of the upper and lower edges of the laser beam. To obtain the range distance separating the array 33 from the laser source 20, the operator depresses the range control switch 89 on the calculator 85, causing the range calculating circuitry to arithmetically process the elevation information obtained from the first and second electrical grade signals to obtain the range distance. The range calculating circuitry of the calculator 85, in response to actuation of range switch 89, determines the absolute difference between elevation information contained in the first and second electrical grade signals, thereby obtaining the width of the laser beam 25. The range calculating circuitry then multiplies the beam width by a predetermined constant to obtain the range distance, and calculator 85 delivers the range distance to the memory register 80 for display on the display component 87. The constant by which the beam width is multiplied is determined by the characteristics of the laser plasma tube 22. Each type of laser tube generates a beam which diverges in direct proportion to distance and at a known rate. This rate is easily obtainable by empirical measurement or from the tube manufacturer, and accordingly is readily available for injection into the calculator 85, which is calibrated to utilize the particular constant required to obtain the range distance. In the event a collimator is used with the laser beam, a different constant must be used by the range calculating circuitry.

When the detection unit 16 must be raised so high on pole 12 as to be above the operator's eye level in order to intercept the laser beam 25, the operator may detach the control console 18 from detection unit 16 by pulling pin 96 outwardly from case 30 to release the cylindrical coupling 92 from the socket 94 and permit separation of console 18 from case 30. By separating the control console, the operator may hold the console 18 in his hand while taking readings and actuating the controls. If desired, the control console 18 may instead be rotated about the axis 95 of cylindrical coupling 92 without detaching it from the detection unit 16, and this procedure is useful where the operator cannot hold console 18 but can reach the console to actuate the controls. In such circumstances, pivoting of the unit places the display and controls in a position conveniently confronting the face of the operator.

After the grade and range distances have been obtained by the operator and recorded in a notebook or the like, he depresses the clear button 79 on gate control 76, thereby clearing the memory register and display 87 so that the apparatus 10 is ready to process grade and range data at the next location.

Figure 8:
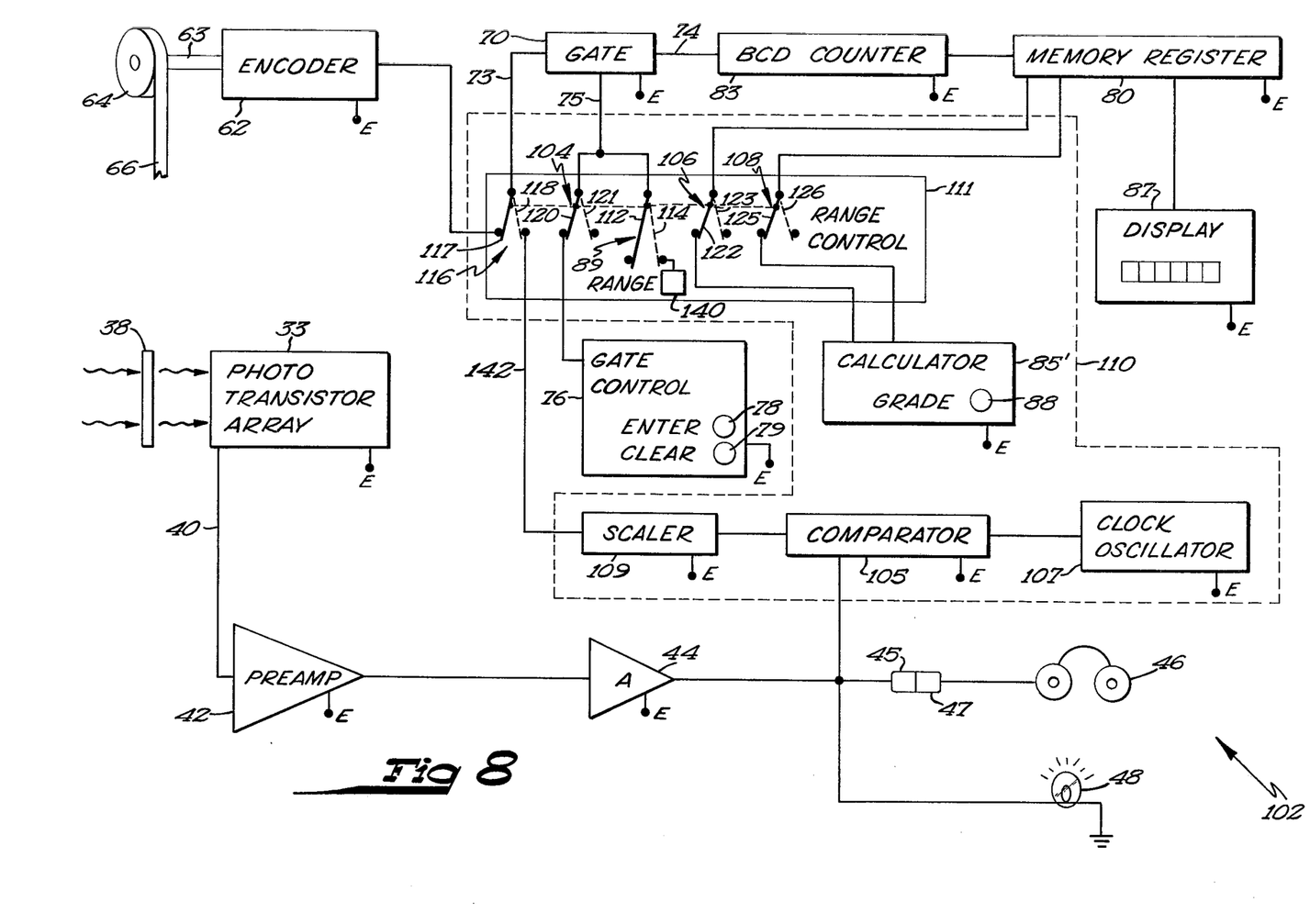
FIG. 8 is a schematic diagram showing the components comprising a second embodiment of the land-surveying apparatus.

Referring now to FIG. 8, a second embodiment 102 of the land-surveying apparatus is shown, the embodiment 102 differing from the embodiment 10 in the apparatus used for determining the range distance. The optical filter 38, phototransistor array 33, preamplifier 42, amplifier 44, speaker 46 and light-emitting diode 48 are identical to those described in conjunction with the embodiment 10 and function in the same manner as described earlier. In addition, the encoder 62, gate circuit 70, gate control 76, binary coded decimal counter 83, memory register 80 and display component 87 are identical to the components already described in conjunction with the embodiment 10 and will not be described in further detail.

To determine grade distance using the embodiment 102, the identical procedure is used as was already described with the embodiment 10, the operator entering first and second electrical grade signals representative of the upper and lower edges of the laser beam 25 in the memory register 80 and then depressing the grade control switch 88 of calculator 85. The range calculating circuitry described as present in calculator 85 of the embodiment 10 is not needed with the embodiment 102 and the calculator 85' of FIG. 8 differs from the calculator 85 only in that respect. The gate control 76 is connected to the control terminal of gate 70 through a normally closed switch 104, which will be described further hereafter. The calculator 85' is connected to the memory register 80 through switches 106 and 108, both of which are normally closed and will be described further hereafter.

The embodiment 102 has electrical range calculating circuitry 110 identified as within the envelope, for determining the range distance separating the laser beam source 20 and the phototransistor array 33, the range calculating circuitry operatively electrically connected with the output of the amplifier 44 to receive information contained in the laser beam 25.

The range calculating circuitry 110 has a comparator 105 electrically connected to receive the output signal from the amplifier 44. The comparator also is connected to receive a reference signal from clock oscillator 107 and to then compare the signal received from the amplifier 44 with the reference signal from the clock oscillator 107.

It is well established that the range distance, namely the distance between the laser source 20 and the detector array 33, hereafter referred to as R, is defined by the equation:

$$R = V/\omega$$

wherein $\omega$ is the angular velocity of the rotating laser beam 25 and V is the linear velocity of the laser beam at a distance R from the laser source 20, as illustrated in FIG. 1. When the motor 26 rotates at a constant speed, the angular velocity $\omega$ is a known quantity; with the embodiment 102 the motor 26 will be rotating the laser at a predetermined constant angular velocity $\omega$. Accordingly, the time interval t required for the laser beam 25 to swing past the detector array 33 in a plane parallel to array axis 34 is defined by the equation:

$$t = d/V$$

wherein $V$ is the linear velocity of the beam 25 at a distance $R$, and $d$ is the length of the phototransistor array as measured along the array axis 34, the distance d being identified in FIG. 6.

Combining the two above equations, one obtains the following equation for the range distance R:

$$R = d/\omega t$$

Since the distance d and the angular velocity $\omega$ are known constants, the range R is inversely proportional to the time $t$ where $t$ is the time duration of the output pulse generated by the phototransistors of array 33 each time the laser beam crosses the array.

In view of the above relationships, the comparator 105 receives a clock reference signal of known time duration from the clock oscillator 107. The comparator 105 compares the time duration of this reference signal with the time duration of the output signal from the amplifier 44, which defines an electrical range input signal representative of the time duration required for the laser beam to swing across the distance the array 33. The comparator contains circuitry to generate a range output signal representative of the difference between the time duration of the reference signal and the signal from the amplifier 44, and delivers the range output signal to the input 73 of gate circuit 70. This range output signal of comparator 105 contains a plurality of pulses, the magnitude of the range distance R determining the precise number of pulses.

The range output signal of the comparator is delivered to input terminal 73 of gate circuit 70 and passes through the gate to counter 83, the counter 83 receiving and counting the pulses from comparator 105 in the same fashion as was the case for the incremental encoder 62. The counter generates a binary signal containing the range information and delivers the binary signal to register 80 for retention by the register and display by component 87.

A scaler circuit 109 is connected between the comparator 105 and the gate circuit 70 so the output of the comparator 105 may be scaled upwardly or downwardly for convenience of display on the display component 87. For example, when the range distance to be displayed is expected to be under 100 feet it is more accurate to use all six digits of component 87 and read distance to ten thousandths of a foot than it would be to use only the first three digits and read distance to a tenth of a foot. Correspondingly, when the range is expected to be between 100 and 1,000 feet, the scaling is adjusted by the scaler 109 to use all six digits of the display 87. If desired, any reasonable number of such scale ranges may be employed with the display 87 and may be provided for by the scaler circuit 109.

A range control unit 111 includes its own range gate control circuit 140 actuated by a range switch 89. When the switch 89 is in position 112, the range gate control circuit 140 of range control unit 111 is isolated from gate circuit 70. When the range switch 89 is swung to position 114 the gate control circuit 140 delivers a triggering pulse through switch 89 to the control terminal 75 of gate 70 to open the gate 70 to permit a range output signal at input terminal 73 to pass through the gate 70 to output terminal 74 and thence to the counter 83, register 80, and display 87. Since the circuitry for range gate control circuit 140 is well known to the art; it will not be described in further detail.

A single-pole, double-throw switch 116 is connected to the input terminal 73 of the gate 70 to alternately connect the gate input terminal 73 to the encoder 62 or the output terminal 142 of the scaler 109. The switch 116 is normally in position 117 connecting the encoder 62 to the gate circuit 70. The switch 116 is mechanically, electromechanically or electronically coupled to the range switch 89 in any known manner such that swinging of the range switch 89 from position 112 to position 114 immediately causes the switch 116 to swing from position 117 to position 118 or vice versa. When the switch 116 swings to position 118, it disconnects the encoder 62 from the gate 70 and instead connects the scaler 109 to the gate.

The switch 104, which like switch 116 is coupled to range switch 89, is normally in position 120 when the range switch 89 is in position 112 and connects the gate control 76 to the control terminal 75 of gate 70, permitting the gate control 76 to actuate the gate 70. Swinging of the range switch 89 from position 112 to position 114 simultaneously swings switch 104 from position 120 to position 121, disconnecting the gate control 76 from gate 70 and assuring that during actuation of the range switch 89 no signals can reach the gate control terminal 75 from the gate control 76.

The switches 106 and 108 are also coupled to the switch 89 and actuated by the swinging of switch 89 as was the case for switches 104 and 116. When switch 89 swings to position 114 the switch 106 swings from position 122 to position 123. Correspondingly, the switch 108 swings from position 125 to 126 as switch 89 swings from position 112 to position 114. Accordingly, when the range switch 89 is actuated and swung to the position 114 to actuate the range gate control circuit 140 the switches 106 and 108 disconnect the memory register 80 from the calculator 85', thereby making it impossible for an operator to inadvertently use the grade switch 88 to process information in the memory register 80. The range control unit 111, like the scaler 109, comparator 105 and clock oscillator 107 are energized from the power source E.

It is preferred that the range switch 89 be a momentary on, push-button switch which remains in the position 114 only when actuated by an operator and otherwise is in the position 112. Accordingly, the range gate control circuitry 140, the range switch 89, and the switches 116, 104, 106 and 108 collectively comprise a range control unit 111. Swinging of the switch 89 from position 112 to position 114 triggers the gate 70 to a conducting state and permits the conduction of a range output signal from the scaler 109 through the switch 116 and into the input terminal 73 of gate 70. This signal contains all information necessary to permit the binary coded decimal counter 83 to generate a binary signal indicating the range distance R.

Only the operation of the range calculating circuitry 110 will be described, because the remaining components of the apparatus 102 have already been discussed and their operation indicated in describing the embodiment 10. Aside from the short time interval during which the operator is actuating range switch 89 to determine the range distance R, the range switch 89 is in position 112. When the switch is in position 112, the coupled switches 116 and 104 are in positions 117 and 120, respectively. In these positions the range calculating circuitry 110 is effectively disconnected from the gate 70. In addition, the switches 106 and 108 are in positions 122 and 125, respectively, when range switch 89 is in position 112, connecting the memory register 80 to calculator 85'. Accordingly, when the range switch 89 is in position 112 the grade gate control 76 is connected directly to the control terminal 75 of the gate circuit 70 through switch 104 and the encoder 62 has its output connected directly to the input 73 of gate circuit 70 through switch 116 which is in position 117. Accordingly, the gate control 76 functions identically as described with the embodiment 10, except during the brief intervals in which the range calculating circuitry 110 is actuated by swinging of the range switch 89 from position 112 to position 114, which will next be described.

When the operator swings the range switch 89 from position 112 to position 114, all of the switches 116, 104, 106 and 108 simultaneously change their positions from the indicated solid line positions to the dotted line positions (FIG. 8). Swinging of switch 116 from position 117 to position 118 disconnects the encoder 62 from the input 73 of gate circuit 70 and instead connects the input 73 of the gate 70 to the scaler circuit 109, permitting the range output signal at the scaler, representative of the magnitude of the range distance R, to be immediately conducted through switch 116 to the input terminal 73 of the gate circuit 70.

As the switch 104 swings from position 120 to position 121, the grade gate control 76 is disconnected from the gate control terminal 75, and inadvertent operation of the enter or clear buttons 78 and 79, respectively, has no impact on gate 70 and accordingly no information can pass from encoder 62 to the register 80 through inadvertent actuation of the enter switch 78 by the operator.

As the switch 89 swings from position 112 to position 114, the range gate control circuitry 140 of range control unit 111 delivers a trigger pulse to the gate control terminal 75, causing the gate circuit 70 to become conducting, thereby permitting the range output signal from the scaler circuit 109 to flow from input terminal 73 through the gate 70 to output terminal 74. This range output signal then continues its flow to binary coded decimal counter 83 where it is converted to a binary coded signal for introduction to the memory register 80. The signal, when received in the register 80, is retained and visibly, digitally displayed by the display component 87 for the operator to immediately read.

As switches 106 and 108 swing to positions 123 and 126, respectively, in response to operation of range switch 89, the connections between calculator 85' and the memory register 80 are disconnected, thereby preventing the injection of grade calculations into the register 80 during display of the range distance in the event the operator inadvertently presses grade switch 88.

When the operator releases the range switch 89, the switches 116, 104, 106 and 108 return to their original solid line positions. The memory register continues to retain the range distance, which remains displayed on the display component 87, until the clear control 79 is energized by the operator to again clear the memory register.

The described embodiments of the invention thus make it possible for an operator by simple manipulation of the controls on the control console 18 to easily obtain the grade and range distances associated with a given grade pole location with great accuracy and minimal possibility of error.

While the preferred embodiments of the present invention have been described, it should be understood that various changes, adaptations and modifications may be made therein without departing from the spirit of the invention and the scope of the appended claims.

What is claimed is:

1. A laser land-surveying apparatus operable from an electrical power source and usable with the beam from a laser beam source for measuring linear displcement comprising:

a rigid grade pole having a base and an apex;
 a laser beam detection unit mounted to said grade pole between base and apex for relative motion between said pole and said detection unit, including a laser beam detector operatively electrically connectable to the power source and generating an electrical detection signal in response to detection of the laser beam;
 indicating means electrically connected to said detector and producing an indication perceptible to an operator in response to any detection of the beam by said detector;

measuring means electrically connectable to the power source and mechanically coupled between said laser beam detection unit and said grade pole to permit relative motion between said detection unit and said pole, said measuring means determining the distance between said laser beam detector and said base of said pole and generating an electrical grade signal containing information representative of the distance between said base and said laser beam detector; and a digital display unit electrically connectable to the power source and electrically connected to said measuring means to receive said electrical grade signal from said measuring means and in response thereto to digitally, visibly display to the operator the numerical grade distance between said laser beam detector and said base of said grade pole.

2. The laser land-surveying apparatus of claim 1 wherein said digital display unit includes:
- a gate circuit having input and output terminals, said input terminal electrically connected to said measuring means to receive said electrical grade signal from said measuring means and selectively permit the passage of said signal through said gate circuit;
- a conversion means electrically connected to said output terminal of said gate circuit to receive said electrical grade signal from said gate circuit and convert said grade signal to a binary coded decimal output containing said information within said electrical grade signal;
- a memory register electrically connected to said conversion means to receive said binary coded decimal output and to store said information in said register;
- a calculator connected to said memory register to receive information therefrom, selectively arithmetically process the information and return the processed information to said memory register; and
- a display component electrically connected to said memory register to receive said information from said memory register and to digitally, visibly display to the operator the information received from said memory register.

3. The laser land-surveying apparatus of claim 2 wherein said digital display unit further includes a manually actuatable gate control means electrically connected to control said gate circuit, said gate control means, when actuated by an operator, causing said gate circuit to pass electrical signals therethrough from said gate input terminal to said gate output terminal.

4. The laser land-surveying apparatus of claim 2 wherein said calculator includes electrical grade calculating circuitry for selectively adding elevation distance information contained in first and second electrical grade signals and then dividing the sum by two, said first grade signal representing the elevation of the lower edge of the laser beam and said second grade signal representing the elevation of the upper edge of the laser beam, said grade calculating circuitry thus obtaining the elevation of the central axis of said laser beam.

5. The laser land-surveying apparatus of claim 2 wherein said calculator includes electrical range calculating circuitry for selectively obtaining the absolute difference between information contained in first and second electrical grade signals and multiplying said difference by a predetermined constant, said first grade signal representing the elevation of the upper edge of the laser beam relative to said base and the second signal representing the elevation of the lower edge of the laser beam relative to said base, thereby permitting said range calculating circuitry to obtain the range distance between the laser source and said detector.

6. The laser land-surveying apparatus of claim 5 wherein said calculator further includes a manually actuatable range switch electrically connected with said range calculating circuitry to cause said range calculating circuitry to obtain said range distance in response to an operator actuating said range switch.

7. The laser land-surveying apparatus of claim 1 and further including a control console carrying said digital display unit, said control console being pivotally mounted to said laser beam detection unit for movement about a horizontal axis, permitting manual swinging of said control console about said horizontal axis to permit easy reading by an operator of the numerical distances displayed by said digital display unit.

8. The laser land-surveying apparatus of claim 7 wherein said control console is detachably carried by said laser beam detection unit to permit said control console to be held at a convenient level by an operator so as to be easily read and operated when said laser beam detection unit is at an inconvenient elevation, said control console including a cable extending between said console and said laser beam detection unit to conduct said electrical grade signals therebetween.

9. The laser land-surveying apparatus of claim 1 and further including electrical range calculating circuitry for determining the distance between said laser beam source and said laser beam detector, said range calculating circuitry being electrically connectable to the power source and electrically connected to said detector to receive from said detector said electrical detection signal, to measure the time duration of said electrical detection signal, and in response generating a range output signal representing the distance between the laser beam source and said laser beam detector and being electrically connected to said digital display unit for delivering said range output signal to said digital display unit.

10. A laser land-surveying apparatus operable from an electrical power source for measuring linear displacement comprising:
- a swingably mounted laser beam source connectable to the power source for generating a laser beam;
- a motor for swinging said laser beam source to define a plane of light, said motor swinging said laser beam source at a predetermined angular velocity;
- a rigid grade pole spaced from said laser beam source and having a base and an apex;
- a laser beam detection unit mounted to said grade pole between base and apex for relative motion between said pole and said detection unit, including a laser beam detector operatively electrically connectable to the power source and capable of producing an electrical range input signal representative of the time duration in which said beam swings across said detector in response to detection of said laser beam;
- indicating means electrically connected to said detector and producing an indication perceptible to an operator in response to detection of the beam by said detector;
- measuring means electrically connectable to the power source and mechanically coupled between said laser beam detection unit and said grade pole to permit relative motion between said detection unit and said pole, said measuring means determining the distance between said laser beam detector and said base of said pole and generating an electrical grade signal containing information representative of the distance between said base and said laser beam detector;

a digital display unit electrically connectable to the power source and electrically connected to said measuring means to receive said electrical grade signal from said measuring means and in response thereto to digitally, visibly display to the operator the numerical grade distance between said laser beam detector and said base of said grade pole; and electrical range calculating circuitry for determining the range distance between said laser beam source and said laser beam detector, said range calculating circuitry electrically connectable to the power source and electrically connected to said detector to receive from said detector said electrical range input signal representing the time duration in which said beam swings across said detector, said range calculating circuitry in response to said electrical range input signal generating a range output signal representing the distance between the laser beam source and said laser beam detector and being electrically connected to said digital display unit for selectively delivering said range output signal to said digital display unit, permitting said digital display unit to digitally, visibly display to the operator the range distance between said laser beam source and said laser beam detector.

11. The laser land-surveying apparatus of claim 10 wherein said range calculating circuitry includes:
a clock oscillator for generating a reference signal of known time duration; and
a comparator electrically connectable to the power source and connected to said clock oscillator to receive said reference signal, said comparator also electrically connected with said detector to compare the time duration of said reference signal with the time interval for said swinging laser beam to traverse a distance d representing the width of said detector, said comparator generating a range output signal representative of the range distance between said laser source and said laser detector and being electrically connected with said digital display unit to deliver said range output signal to said digital display unit for visible digital display to an operator.

12. The laser land-surveying apparatus of claim 11 wherein said digital display unit includes a gate and said range calculating circuitry further includes a range control unit having a range switch thereon, said range control unit electrically connectable to the power source and electrically connected to said gate to cause said gate to pass signals therethrough in response to actuation of said range switch 13. The laser land-surveying apparatus of claim 12 wherein said range control unit further includes a first switch electrically connected in series between said measuring means and said gate to interrupt current flow therebetween and alternatively connect said gate with said comparator to receive said range output signal from said comparator and conduct said range output signal to said gate, said first switch being actuated by said range switch to disconnect said measuring means from said gate and connect said comparator with said gate in response to actuation of said range switch by an operator.

14. A laser land-surveying apparatus operable from an electrical power source and usable with the beam from a laser beam source for measuring linear displacement comprising:
a rigid grade pole having a base and an apex;
a laser beam detection unit mounted to said grade pole between base and apex for relative motion between said pole and said detection unit, including a laser beam detector operatively electrically connectable to the power source;
indicating means electrically connected to said detector and producing an indication perceptible to an operator in response to detection of the beam by said detector;
measuring means electrically connectable to the power source and mechanically coupled between said laser beam detection unit and said grade pole to permit relative motion between said detection unit and said pole, said measuring means determining the distance between said laser beam detector and said base of said pole and generating an electrical grade signal containing information representative of the distance between said base and said laser beam detector;
a digital display unit electrically connectable to the power source and electrically connected to said measuring means to receive said electrical grade signal from said measuring means and in response thereto to digitally, visibly display to the operator the numerical grade distance between said laser beam detector and said base of said grade pole; and
said measuring means including an incremental encoder carried by said laser beam detection unit and having a rotatable shaft, said encoder generating an electrical signal representative of the angular displacement of said shaft, said measuring means further including a tape reel fixed on said encoder shaft and a tape tautly extending from said reel to said grade pole and fixed to said pole adjacent an end of said pole such that linear movement of said detection unit relative to said pole rotates said tape reel and said encoder shaft, permitting said encoder to generate said electrical grade signal representative of the angular displacement of said shaft and thus representative of the distance between said base and said beam detector.

15. The laser land-surveying apparatus of claim 13 wherein said laser beam detector includes a plurality of phototransistors positioned along a common axis, said axis being substantially perpendicular to said grade pole.

16. The laser land-surveying apparatus of claim 15 wherein said digital display unit includes:
a gate circuit having input and output terminals, said input terminal electrically connected to said measuring means to receive said electrical grade signal from said measuring means and selectively permit the passage of said signal through said gate circuit;
a conversion means electrically connected to said output terminal of said gate circuit to receive said electrical grade signal from said gate circuit and convert said grade signal to a binary coded decimal output containing said information within said electrical grade signal;
a memory register electrically connected to said conversion means to receive said binary coded decimal output and to store said information in said register;

a calculator connected to said memory register to receive information therefrom, selectively arithmetically process the information and return the processed information to said memory register; and a display component electrically connected to said memory register to receive said information from said memory register and to digitally, visibly display to the operator the information received from said memory register.

17. The laser land-surveying apparatus of claim 16 wherein said calculator includes electrical grade calculating circuitry for selectively adding elevation distance information contained in first and second electrical grade signals and then dividing the sum by 2, said first grade signal representing the elevation of the lower edge of the laser beam and said second grade signal representing the elevation of the upper edge of the laser beam, said grade calculating circuitry thus obtaining the elevation of the central axis of said laser beam.

18. The laser land-surveying apparatus of claim 16 wherein said calculator includes electrical range calculating circuitry for selectively obtaining the absolute difference between information contained in first and second electrical grade signals and multiplying said difference by a predetermined constant, said first grade signal representing the elevation of the upper edge of the laser beam relative to said base and the second signal representing the elevation of the lower edge of the laser beam relative to said base, thereby obtaining the range distance between the laser source and said detector.

19. A laser land-surveying apparatus operable from an electrical power source and usuable with the beam from a laser beam source for measuring linear displacement comprising:

a rigid grade pole having a base and an apex;

a laser beam detection unit mounted to said grade pole between base and apex for relative motion between said pole and said detection unit, including a laser beam detector operatively electrically connectable to the power source;

indicating means electrically connected to said detector and producing an indication perceptible to an operator in response to detection of the beam by said detector;

measuring means electrically connectable to the power source and mechanically coupled between said laser beam detection unit and said grade pole to permit relative motion between said detection unit and said pole, said measuring means determining the distance between said laser beam detector and said base of said pole and generating an electrical grade signal containing information representative of the distance between said base and said laser beam detector; and a digital display unit electrically connectable to the power source and electrically connected to said measuring means to receive said electrical grade signal from said measuring means and in response thereto to digitally, visibly display to the operator the numerical grade distance between said laser beam detector and said base of said grade pole.

20. The laser land-surveying apparatus of claim 19 wherein said measuring means coupled between said laser beam detection unit and said grade pole is connected to the base of said grade pole.

* * * * *